Oct. 14, 1969  J. J. RIGA  3,472,620
PROCESS FOR THE MANUFACTURE OF NITRIC ACID
Filed Nov. 13, 1967
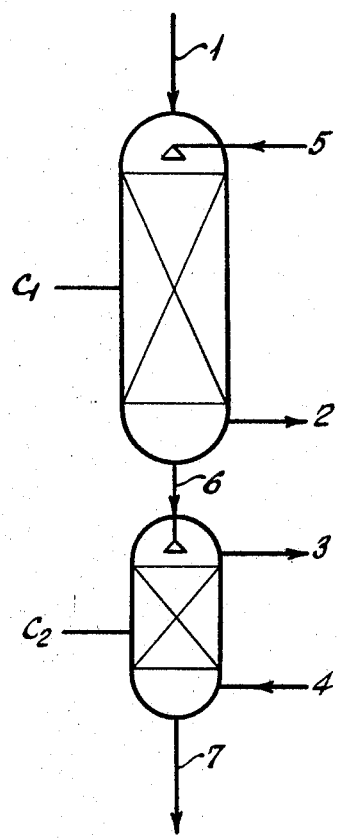
INVENTOR
JEAN JOSEPH RIGA
BY
ATTORNEY 3,472,620
PROCESS FOR THE MANUFACTURE
OF NITRIC ACID
Jean Joseph Riga, Liege, Belgium, assignor to Societe Belge de l'Azote et des Produits Chimiques de Marly, S.A., Ougree, Belgium
Filed Nov. 13, 1967, Ser. No. 682,155
Int. Cl. C01b 21/44
U.S. Cl. 23—160     6 Claims

ABSTRACT OF THE DISCLOSURE

Process for the manufacture of nitric acid including intermixing the nitric acid with an oxidizing gas in parallel flow and then subjecting the resulting acid to counter flowing air.

---

The present invention relates to a process for the production of nitric acid, more particularly for the production of concentrated nitric acid.

The process normally used for the production of nitric acid consists in converting ammonia into oxides of nitrogen mainly NO, oxidizing these oxides into $NO_2$ and absorbing this in water whereby aqueous nitric acid solutions having a content of about 60 percent acid are obtained. By the stipulation of the conditions of pressure and temperature as well as the duration of the absorption a nitric acid can be arrived at which contains the dissolved oxides of nitrogen and has an apparent density, which corresponds to that of a nitric acid having a titer of 70 percent. If however the dissolved oxides of nitrogen are expelled by degassing, then the nitric acid only has an actual density of 1.38 to 1.39 which corresponds to a 62–65 percent by weight nitric acid.

The type of nitrogen oxide dissolved in the nitric acid is not precisely known. It is however assumed that during the absorption of the $NO_2$ by water or dilute nitric acid solutions, NO forms according to the following equation:

$$3 NO_2 + H_2O \rightarrow 2HNO_3 + NO$$

A part of the NO combines with $NO_2$ forming $N_2O_3$ and other lower oxides of nitrogen which remain dissolved in the nitric acid and give it an apparent density which is equal to that of a highly concentrated nitric acid which is free from dissolved oxides of nitrogen.

It is of interest in the industry to obtain a concentrated nitric acid, for example one of 70 percent which is free from dissolved oxides of nitrogen, i.e. a nitric acid whose true density is in the region of 1.415.

In order to achieve this, it has already been proposed to treat a mixture of nitric acid and liquid $N_2O_4$ with oxygen, more particularly in counter-flow having a long course or in which absorption and re-oxidation processes are carried out parallel to and synchronous with each other.

By the method according to the invention, a concentrated nitric acid may be obtained in a simple and effective manner. The method consists in obtaining by absorption of oxides of nitrogen a nitric acid containing dissolved oxides of nitrogen and in an apparent density of about 1.45 feeding this acid into the top of a tower where it is treated with a parallel feed current of air and/or oxygen, and then passing the acid thus obtained into a second tower in which it is treated with air in counter-flow so that the remaining dissolved oxides of nitrogen are drained away and a colorless nitric acid is obtained whose concentration amounts to about 70 percent and which has a true density of about 1.415.

A nitric acid containing dissolved oxides of nitrogen may be obtained by stipulating the pressure and temperature conditions as well as the absorption time of the $NO_2$ in water or dilute aqueous solutions of nitric acid. This acid, which contains dissolved oxides of nitrogen and has an apparent density of about 1.45 is fed into the top of a tower where it is treated in parallel flow with air and/or oxygen. Oxidation of the oxides of nitrogen takes place in situ with formation of $NO_2$ and subsequent formation of $HNO_3$. This oxidation takes place at room temperature and under a pressure of 1 atmosphere. It has however been ascertained that the speed of oxidation may be increased if the tower is maintained at higher pressures and temperatures. Tests have shown that in industrial plants it is not advantageous to exceed a temperature of 50° C. and a pressure of 10 atmospheres. Under these conditions about ¾ of the original oxides of nitrogen dissolved in the nitric acid will be oxidized. For the improvement of the contact of the liquid phase with the air or oxygen a tower filled with Raschig rings or a tower which is provided with suitable devices for guaranteeing a good distribution and good contact of the gases with the liquid is used.

The nitric acid thus obtained is passed into a second tower where the degassing of the still dissolved oxides of nitrogen takes place. The degassing tower (or stripping tower) may form an extension or continuation of the oxidation tower. This degassing is carried out by means of a gas, for example air, passed in counter-flow to the nitric acid. The released nitric oxides are then returned to the absorption zone whilst the concentrated colorless nitric acid is collected.

The stripping preferably takes place at a temperature in the region of 50° C. and under a pressure between atmospheric pressure and the pressure in the oxidation phase.

A plant for carrying out the method according to the invention is shown in the drawing by way of example only.

The plant consists of two towers $C_1$ and $C_2$ arranged one above the other. The oxidation takes place in the upper tower $C_1$ while the stripping takes place in the lower tower $C_2$. The nitric acid containing the dissolved oxides of nitrogen is fed in through the duct 5, while air and/or oxygen is fed in through the duct 1, and flow in parallel currents with the liquid phase in the oxidation zone 1 and leaves in the duct 2 taking with it non-bound oxides of nitrogen. The latter mixture may advantageously be returned into the absorption zone. The nitric acid then passes via the duct 6 and the stripping tower $C_2$ where it encounters air fed in counter-flow which is fed through the duct 4. The air, which is loaded with the oxides of nitrogen separated from the nitric acid is returned via a duct 3 into the absorption zone. The decolored, concentrated nitric acid is drawn away via duct 7.

The following is illustrative of one method of operation according to the invention.

The tower $C_1$ having a diameter of 1.25 m. is filled to a height of 16.5 with Raschig rings. 700 Nm. 3/hr. air at a temperature of 35° C. is fed in through the duct 1 while 14 m. 3/h. nitric acid having a temperature of 50° C. and a density (measured at 15° C.) of 1.432 is fed in through duct 5. This acid contains 5.75 percent by weight of dissolved oxides of nitrogen. The pressure in the tower $C_1$ amounts to 7 atmospheres under which pressure the oxidation of the nitric oxide takes place. About 700 Nm. 3/h. of air at the temperature of 45° C. passes out via duct 2.

The tower $C_2$ having a diameter of 1.20 m. likewise contains Raschig rings to a height of 2.15 m. 14 m. 3/h. of nitric acid is passed into this tower via duct 6 from tower $C_1$ and is subjected to a stripping treatment at 1 atmosphere by means of 700 Nm. 3/h. of air which has a temperature of 20° C.

What is claimed is:
1. A process for the production of concentrated nitric acid comprising, in a first zone, conducting the steps of intimately intermixing nitric acid containing dissolved oxides of nitrogen with an oxidizing gas in a substantially parallel flow to oxidize said dissolved oxides of nitrogen to nitric acid and then treating said nitric acid in a second zone by directing a flow of air counter to the flow of nitric acid to separate the oxides of nitrogen remaining dissolved, whereby a nitric acid is produced wherein the content by weight of $HNO_3$ is greater than that of the untreated nitric acid.

2. A process according to claim 1 wherein said oxidizing gas is air.

3. A process according to claim 1 wherein said oxidizing gas is oxygen.

4. A process according to claim 1 wherein said parallel flow of nitric acid and oxidizing gas is performed in a temperature of 20° C. to 50° C. and at a pressure of from 1 to 10 atmospheres.

5. A process according to claim 1 wherein said counter flow is performed at a pressure of the order of 1 to 10 atmospheres.

6. A process according to claim 4 wherein said counter flow is performed at a pressure of the order of 1 to 10 atmospheres.

References Cited

UNITED STATES PATENTS

| 1,338,417 | 4/1920 | Bergve et al. | 23—160 |
| 1,939,162 | 12/1933 | Caro et al. | 23—160 |
| 2,027,578 | 1/1936 | Jahn | 23—160 |
| 2,135,733 | 11/1938 | Richardson | 23—162 |

FOREIGN PATENTS

| 378,894 | 8/1932 | Great Britain. |
| 456,518 | 11/1936 | Great Britain. |

OSCAR R. VERTIZ, Primary Examiner

G. O. PETERS, Assistant Examiner